United States Patent [19]

Rubey

[11] Patent Number: 4,620,256
[45] Date of Patent: Oct. 28, 1986

[54] MAGNETIC COMPUTER TAPE CLEANER

[75] Inventor: Ulyss R. Rubey, Lewisville, Tex.

[73] Assignee: Media Recovery, Inc., Dallas, Tex.

[21] Appl. No.: 635,722

[22] Filed: Jul. 30, 1984

[51] Int. Cl.[4] .......................... G11B 5/00; A47K 7/02
[52] U.S. Cl. .............................. 360/137; 15/DIG. 13
[58] Field of Search ................. 360/137; 15/DIG. 13, 15/210 R

[56] References Cited

U.S. PATENT DOCUMENTS

| | | | |
|---|---|---|---|
| 3,266,196 | 8/1966 | Barcaro | 360/128 X |
| 3,370,982 | 2/1968 | Hayunga | 360/137 X |
| 3,683,445 | 8/1972 | Hagadorn | 360/137 X |
| 3,872,510 | 3/1975 | Childress, Jr. | 360/137 |
| 4,081,878 | 4/1978 | Seidel et al. | 360/137 X |

FOREIGN PATENT DOCUMENTS 993326  1/1983  U.S.S.R. .............................. 360/137

OTHER PUBLICATIONS

*Method of Cleaning Magnetic Tape*, R. S. Haines, IBM Technical Disclosure Bulletin, vol. 1, No. 6, Apr. 1959, pp. 16–17.

*Primary Examiner*—Robert S. Tupper
*Assistant Examiner*—Theodore W. Olds
*Attorney, Agent, or Firm*—Wofford Fails & Zobal

[57] ABSTRACT

An improvement in a magnetic tape cleaner apparatus that includes supply reel, take-up reel, wiper for wiping the tape, winder and rewinder for moving the tape between the respective reels, the improvement being characterized by a scraper blade for scrapingly engaging the tape for removing debris therefrom for improving subsequent tape-to-head contact and a holder and ultrasonic vibrator for ultrasonically transducing the scraper blade as it is scrapingly engaging the tape before efficiently removing the debris such that subsequent tape-to-head contact is improved. Specific preferred embodiments include one in which there is provided an automatic rewind for sensing when the tape is wound onto the take-up reel sufficiently and automatically rewinding it past the scraper blade being ultrasonically transduced for the more effective cleaning action as it is rewound onto the supply spool; where packing wheel is provided for removing air between the windings of the tape on the supply reel and where a particular apparatus and angles of contact are delineated.

11 Claims, 4 Drawing Figures

MAGNETIC COMPUTER TAPE CLEANER

FIELD OF THE INVENTION

This invention relates to magnetic tape cleaners. More particularly, it relates to an improved apparatus and method for more efficiently and effectively cleaning a magnetic computer tape such that improved tape-to-head contact is effected in subsequent use.

BACKGROUND OF THE INVENTION

Magnetic tape has not been around for many decades. As the magnetic oxide crystals continue to grow smaller and the number of bits of information stored on the tape grow larger, it becomes more demanding that the surface of the tape is as nearly perfectly "clean" as possible to prevent dropping bits of information because of poor tape-to-head contact. An excellent discussion of the magnetic tape, the inclusion of the high density of bits and the necessity for cleaning is given in U.S. Pat. No. 3,587,128. That patent reports the manufacture of the tape by the tedious and exacting process of growing magnetic oxide crystals and applying them to a sheet of base material such as acetate or Mylar polyester film approximately 0.001 inch thick in a plastic vehicle form of coating material and thereafter cutting the tape to the desired length and width. Therein is also described the high density of information bits for current computer users with multiple head arrangements and the "signal drop out", an unwanted condition causing the read-out head to drop bits of information because of high spots, or debris, on the surface of the tape that prevents good tape-to-head contact. That patent goes on to describe several cleaning methods and apparatus such as disclosed in U.S. Pat. No. 3,035,295, employing a metal scraper. That patent goes on to point out the disadvantages of the metal scraper blade in leaving bits of metal and forming an uneven cutting edge that scrapes, scratches, or otherwise damages the tape. The solution as delineated in that patent is to use a hard monocrystalline material such as sapphire or ruby that is harder than the oxide coating on the tape and which can be formed into a uniform cutting edge to achieve superior results.

Illustrative of other tape cleaning apparatus are those pieces of apparatus described in the following U.S. Pat. Nos.: 3,266,196 describes a tape cleaner employing a gear reducer for driving the tape cleaning head. 3,475,782 describes a magnetic tape cleaner in which slight distortion of the tape is effected by two rollers 43 on either side of the cleaning head 19. 3,587,128 has already been described hereinbefore and discloses the use of a hard monocrystalline material in the scraper blade means for scraping the front surface of the tape. 3,701,178 describes a cassette tape cleaner in which a plurality of scraping blades project into standard openings in the cassette when the cassette is inserted in the apparatus and employing a blast of air to remove scrapings away from the blades and the tape. 3,757,374 describes a magnetic tape cleaner in which the tape contact the edge of a blade and then onto a take-up reel, the blade having a plurality of cutting edges and lengths at least twice the width of the tape to be cleaned. That apparatus then rotates the blade holding member so that the edge of the blade is used in succession and when all exposed edges of the blades have been used to clean the tape, the blade is removed from the holder and repositioned with the unexposed portion ready for use, thereby doubling the useful life of a blade.

Looking at another aspect of the invention, there is published in the IBM Technical Disclosure Bulletin, volume 1, number 6, April 1959, a method of cleaning magnetic tape in which it is run through a solution having ultrasonic agitation, the solution being selected to be 100 percent (%) volatile so as to leave no residue on the tape.

From the foregoing, it can be seen that the prior art has provided a variety of means of cleaning magnetic tape to avoid scratching, leaving metallic particles thereon, leaving other undesirable debris and attempting to prevent unwanted "drop out" of bits of information from faulty tape-to-head contact when subsequently used; yet, the prior art approaches have not been totally satisfactory, probably because embedded debris was not adequately removed by the blades nor by the ultrasonic vibration in a solution.

SUMMARY OF THE INVENTION

Accordingly, it is an object of this invention to provide method and apparatus for cleaning magnetic tape or the like in which debris is more effectively removed than in any of the prior art methods, yet substantially uniform cleaning of the tape by a uniform edge is effected for improved subsequent tape-to-head contact.

It is a specific object of this invention to provide a method of first cleaning the tape on forward movement onto a take-up reel and, thereafter, automatically rewinding and cleaning the tape by a preferred bit of apparatus and method during rewinding onto a supply reel to obviate the disadvantages and deficiencies of the prior art.

These and other objects will become apparent from the following descriptive matter, particularly when taken into conjunction with the appended drawings.

In accordance with one embodiment of this invention, there is provided an improved apparatus, including:

a. a supply reel having the magnetic tape thereon for supplying the tape to be cleaned;

b. a take-up reel for taking up the tape which has been cleaned;

c. wiper means for wiping the tape;

d. winding means for winding the tape from the supply reel past the wiper means onto the take-up reel; and e. rewinding means for rewinding the tape from the take-up reel back onto the supply reel; the improvement comprising:

f. a scraper blade means for scrapingly engaging the front surface of the tape for removing debris therefrom and improving subsequent tape-to-head contact; said scraper blade means being disposed between the take-up reel and the supply reel and adapted to be moved into engagement with the surface of the tape; and g. a holder and ultrasonic vibrator means for ultrasonically transducing said scraper blade means as it scrapingly engages the tape for more effectively removing debris from the surface of the tape whereby subsequent tape-to-head contact is improved.

In another embodiment of this invention, there is provided an improved method in which the magnetic tape is cleaned by ordinary wiper means and by a scraper blade means that is ultrasonically vibrated as it contacts the surface of the tape for more effectively removing the debris therefrom and improving subsequent tape-to-head contact when the tape is later reused.

The respective preferred apparatus and method steps are delineated more nearly completely hereinafter.

DESCRIPTION OF PREFERRED EMBODIMENT(S)

This invention will be described with respect to cleaning magnetic tape, although it should be borne in mind that it is useful for cleaning any tape in which orientable domains, such as the magnetic oxide crystals, are included on the surface of a tape in a coating that must be cleaned to have better coating-to-head contact. It has been successfully employed and demonstrated to have advantageous results compared to prior art cleaning processes with magnetic computer tape and, accordingly, will be described with respect to this embodiment. Ordinarily the magnetic tape is about one-half inch wide and may be available in rolls up to 2400 feet or more in length.

Figure 1:
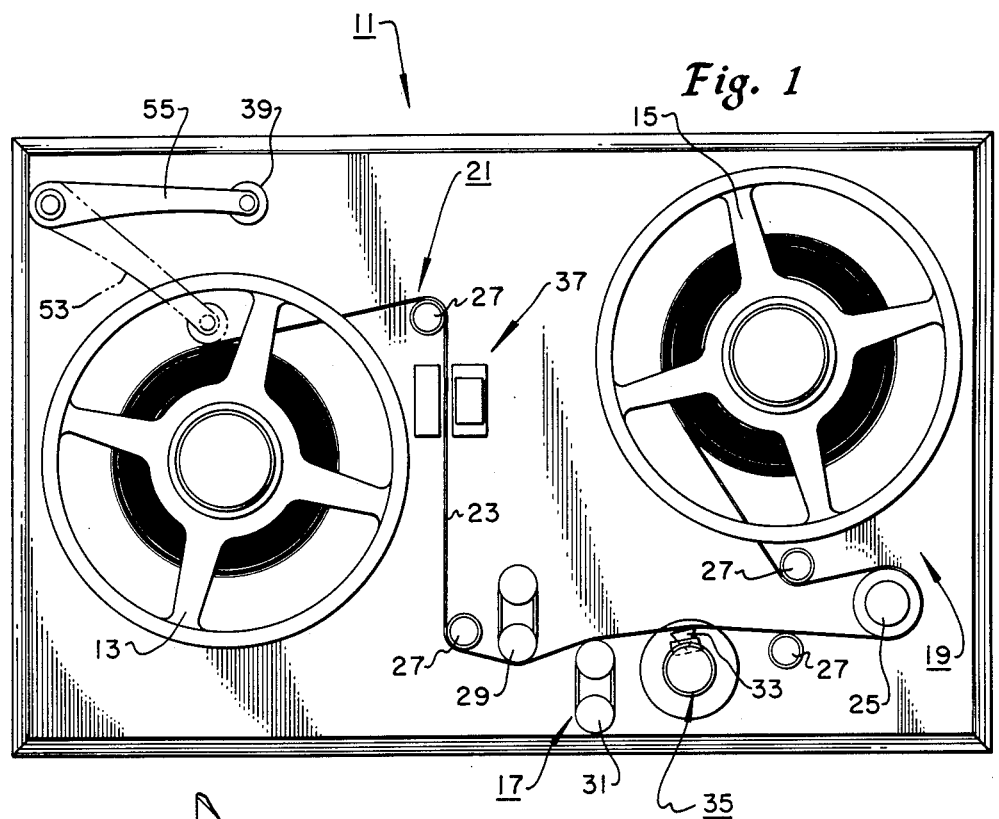
FIG. 1 is a front elevational view of the magnetic tape cleaner in accordance with one embodiment of this invention.

Referring to the figs. and in particular to FIG. 1, magnetic tape cleaner 11 is illustrated. Magnetic tape cleaner 11 includes a supply reel 13, a take-up reel 15, wiper means 17 for wiping the tape and giving it the conventional type cleaning action, winding means 19 for winding the tape from the supply reel past the wiper means and onto the take-up reel; and rewinding means 21 for rewinding the tape back onto the supply reel from the take-up reel.

The supply reel 13 is a conventional reel, ordinarily of plastic or the like onto which the leading end of the tape 23 is wound. The supply reel may be a conventional using reel that will be used on the computer or the like or it may be a supplemental reel onto which the tape is wound specifically for the purpose of cleaning. In any event, the supply reel is well known and need not be described at length herein. Ordinarily, the supply reel is braked by suitable device such as brake or clutch (not shown) to maintain tension in the tape, although the capstans and the respective drives can be geared to do so as the tape is wound onto the take-up reel.

The take-up reel 15 is driven by any suitable device such as a motor with clutch (not shown). If desired, the tape guides can be disposed so as to provide the requisite tension in the tape 23 as it is fed around the capstan 25. The capstan 25 may be reversible to form part of both the winding means 19 and the rewinding means 21 if desired. On the other hand, the capstan may be employed to move the tape onto the take-up reel 15 and the take-up reel through its clutch merely take up what is fed to it and rely upon a powered drive on the supply reel 13 for rewinding the tape thereonto and the capstan 25 can be merely an idler in the rewinding operation.

The type of winding and rewinding means that are employed is not critical to this invention.

The tape 23, as noted in U.S. Pat. No. 3,587,128 comprises a length of base material having a coating containing the magnetically orientable domain such as magnetic oxide crystals therewithin. Accordingly, the back of the tape need not be cleaned to such exacting requirements, although it is desired to have it cleaned. It is the front of the tape, however, that small particles, commonly referred to as debris, become embedded in and normally create imperfections in the tape-to-head contact. Normal cleaning has not been successful in removing all of these particles of debris.

A plurality of tape guides 27 are disposed as essentially idler rollers to constrain the tape to follow a desired path in moving past the respective elements, including the wiper means 17.

The wiper means 17 may comprise tissue or any of the conventional cleaning wipers. As shown, the wiper means 17 includes a backside wiper 29 and a front side wiper 31. As indicated these wipers may comprise conventional endless loops, or belts, of the wiper material, such as tissue, which drag and make the desired wiping and cleansing action on both sides of the tape 23 as it is moved from the supply reel 13 onto the take-up reel 15.

Figure 3:
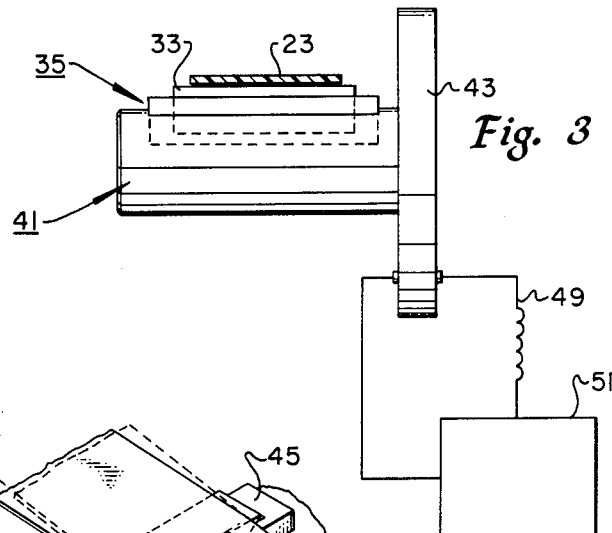
FIG. 3 is a schematic side elevational view of the ultrasonically transduced wiper blade means of FIG. 1.
Figure 4:
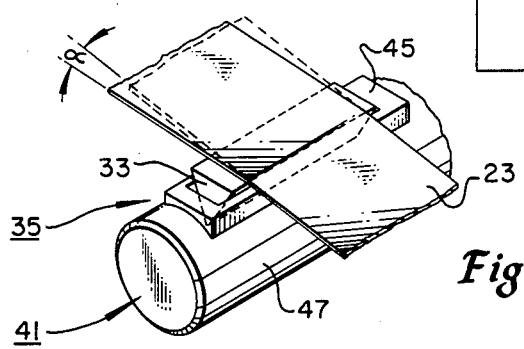
FIG. 4 is an isometric view showing the contact of the surface of the tape with a cleaning edge of the scraper blade means of the embodiment of FIG. 1.

The improved arrangement in this invention lies in the improved scraper blade means 33, FIGS. 1, 3 and 4 and the holder and ultrasonic vibrating means 35 for ultrasonically transducing the scraper blade means as it scrapingly engages the tape for more effective removal of the debris from the surface of the tape.

Another important advantageous feature of this invention is the use of the automatic rewind detector means 37, FIG. 1, for detecting when the tape has been wound off of the supply reel 13 sufficiently and automatically effects rewinding and repositioning of the respective sub-elements as described in more detail hereinafter.

Still another significant portion of this invention is the packing wheel 39, FIGS. 1 and 2, as will be described in more detail later hereinafter.

The scraper blade means 33 is preferably one of the hard monocrystalline blades such as described in U.S. Pat. No. 3,587,128, formed of sapphire or ruby or the like. The cleaning blade is ordinarily triangular in cross-sectional shape and is approximately $\frac{3}{4}$ of an inch long and about 2/10 inch on each side. If one part of the blade becomes dull, the cleaning blade, or scraper blade means 33 can be taken out and reversed to use another edge. Expressed otherwise, the cleaning blade is firmly but removably held in the holder and vibrator means 35.

The holder and vibrator means 35 consists of the holder 41 and the ultrasonic transducer 43. The holder 41 includes a blade holder 45 and a base portion 47. The blade holder 45 may be formed of metal or other suitably strong material having suitable means such as a conforming recess, for firmly but removably receiving the scraper blade means 33 and holding it in the desired position for contacting the tape 23. For example, it has been found advantageous to machine an aluminum part that holds the sapphire or ruby blade rigidly. The blade holder 45 is rigidly affixed to the base portion 47.

The base portion 47 can be thought of as a driver board and is rigidly affixed, as by epoxy or the like, to the ultrasonic transducer 43. The ultrasonic transducer is connected by a suitable circuit 49 with a driver circuit board 51 in accordance with conventional technology. This technology has long been used in vibrating footbaths, ultrasonic transducers for well logging, inspection of goods and the like so it need not be described in detail herein. It is sufficient to note that the ultrasonic transducer vibrates the blade at about 40,000 cycles per second (40,000 Hz) when energized and when contacting the tape 23 for cleaning. To obtain the necessary tension and intimate contact with the edge of the scraper blade means 33, the tape 23 is bent at an angle $\alpha$ at the point of contact with the scraper blade means 33. Expressed otherwise, the scraper blade means 33 is inserted sufficiently into the straight line path tape ordinarily takes to distort it and effect a bend of the angle $\alpha$.

The angle $\alpha$ is in the range of 5-15 degrees. Preferably it is about 10 degrees. This forms sufficient intimate contact and tension to remove embedded debris; yet, does not scratch the surface of the tape 23. As a matter of fact, the transducer that is employed in this invention is the same transducer that is employed in inducing ultrasonic vibrations into liquid footbaths, so both it and its drive circuit are commercially available and need not be described in detail herein.

The automatic rewind detector means 37 comprises a photo detector that is conventional and that is hooked into the control circuit to automatically energize the rewinding means and to effect movement through a conventional solenoid operation (not shown) of the scraper blade means into contact with the tape 23 as described hereinbefore. These means for moving the scraper blade means are conventional and have been employed in the magnetic tape cleaners in the past. Consequently, they need not be described in detail herewithin to lengthen this already long patent application.

Figure 2:
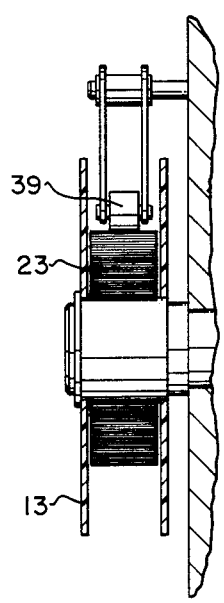
FIG. 2 is a partial side elevational view, showing the packing wheel of the embodiment of FIG. 2 for securing a more nearly uniform pack of tape as it is rewound after being cleaned, eliminating air from intermediate the windings of the tape about its spool.

The packing wheel 39 is moved into its rewind position, as shown by the phantom lines 53, FIG. 1, and shown in FIG. 2. As can be seen in FIG. 2 in particular, the packer wheel 39 packs the respective layers of tape to remove the air from between respective layers, or windings of tape and forms them uniformly into the center of the wheel, leaving an air gap between the edges of the rewound tape 23 and the sides of the supply reel 13. The packing wheel 39 comprises an idling wheel journalled for rotation about its support shaft and at the end of a pivotally mounted lever 55. Preferably the wheel is formed of an elastomeric thermoplastic material such as polyurethene, neoprene or the like. Since it contacts the back side of the tape 23, it is not as critical in composition, although it is imperative that it not deposit small particles of debris that could be embedded in the front of an adjacent layer of tape.

In operation, the magnetic computer tape 23 which is typically ½ inch wide and 2400 feet long is reeled from the supply reel 13 through tape guides 27. It passes photodetector in the automatic rewind detector means 37 and traverses past the respective wiper means 17, including both backside wiper 29 and frontside wiper 31. It then traverses on past the capstan 25 and onto the take-up reel 15 without contacting the scraper blade means 33 in its forward moving, or winding direction. The automatically advancing tissues on the respective wiper means 29 and 31 effect the normal cleaning of the tape as it passes. Thus gross and easily removable debris is removed from both the front and back of the tape. The tape 23 goes around the capstan 25 which drives the tape at the desired speed. The tape is wrapped, as illustrated, about 180 degrees about the capstan and by way of tape guides onto the take-up reel 15.

When the desired amount of tape is reeled from the supply reel 13 onto the take-up reel 15, as detected by the photodetector in the automatic rewind detector means 37, there is still enough tape left on the supply reel 13 so that it will not come off the hub. At this point, the winding means is de-energized and the rewind means is energized. Also, as noted, the automatic mechanism moves the scraper blade means 33 into the path of the tape to form the desired angular distortion $\alpha$ and the packer wheel 39 is moved into its ghosted position 53 for packing the respective windings of the tape on the supply reel as it is rewound thereonto.

The scraper blade means 33 is being ultrasonically vibrated, or transduced by the ultrasonic transducer 43 during this rewinding operation and effects superior cleaning of the debris from the surface of the tape as noted herein.

The packing wheel 39 packs the tape to eliminate air from between the layers of the tape and forms a uniform layer with air space between the edges of the tape and the sides of the supply reel 13. If the packing wheel did not wind the tape uniformly, there would be air trapped and the layers of tape would slip back and forth to contact the edge of the wheel and subsequently cause drag. This results in superior performance and is not known to be on any other similar machines.

Also, it is not known of any machine that employs the automatic rewind detector such that the machine does not stop at the end of a traverse but automatically reels the tape back onto the supply reel, simultaneously cleaning it with the ultrasonically transduced cleaning blade.

As indicated hereinbefore, the tape 23 moves across the sapphire blade at a distortion angle of about 10 degrees across the edge of the sapphire or ruby blade to be held with about 6 ounces of tension on the tape. This affords a nearly ideal amount of tension and contact with the ultrasonically transduced edge of the blade which is being vibrated at about 40,000 Hertz. It is theorized, although the theory is given only by way of explanation and not by way of limitation, that there is a slicing effect of the cutting edge of the ultrasonically transduced and vibrating blade with any debris that would be embedded in the surface of the tape. Consequently, any abnormalities or protrusions that would cause a bad tape-to-head contact later are removed and there are lesser protrusions that would cause any such loss of perfect tape-to-head contact in later use. It is known that the tape is cleaned to form superior tape for subsequent use. More than 1,000 tapes have been tested with this ultrasonically transduced blade and favorable results have been obtained compared to conventional cleaning.

From the foregoing it can be seen that the objects of this invention are accomplished.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In a method of cleaning a computer tape in which the tape traverses past cleaning and wiper means and traversing from a supply reel onto a take-up reel and back, the improvement comprising contacting the tape with an ultrasonically vibrating scraper blade for scrapingly engaging the surface of the tape for removing debris therefrom and improving subsequent tape-to-head contact.

2. The method of claim 1 wherein said tape is cleaned in the normal fashion when moving from a supply reel onto a take-up reel by a normal cleaner and wiper means and wherein said tape has its surface vibratingly and scrapingly engaged by the scraper blade means on being returned to the supply reel from the take-up reel.

3. The method of claim 2 wherein said scraper blade means is pushed into said surface of said tape sufficiently to form a distortion of the straight line of the tape and form an angle $\alpha$ within the range of 5–15 degrees so as to get sufficient engagement of the cutting edge with the surface of the tape for removing the debris substantially uniformly therefrom.

4. The method of claim 3 wherein $\alpha$ is about 10 degrees.

5. The method of claim 1 wherein said scraper blade means is held within a holder and an ultrasonic transducer vibrates both the holder and the scraper blade means while said tape contacts the edge of said scraper blade means as it is rewound onto said supply reel from said take-up reel.

6. An improvement in an magnetic tape cleaning apparatus including:
a. a supply reel having the magnetic tape thereon for supplying the tape to be cleaned;
b. a take-up reel for taking up the tape which has been cleaned;
c. wiper means for wiping the tape as a part of the cleaning;
d. winding means for winding the tape from said supply reel past the wiper means and onto said take-up reel; and
e. rewinding means for rewinding the tape from said take-up reel back onto said supply reel;
the improvement comprising:
f. a scraper blade means for scrapingly engaging the tape for removing debris therefrom and for improving subsequent tape-to-head contact in use; and
g. a holder and ultrasonic vibrating means for ultrasonically transducing said scraper blade means as it scrapingly engages the tape for more efficiently removing debris from the surface of said tape whereby the tape is cleaned more effectively and subsequent tape-to-head contact is improved.

7. The improved tape cleaning apparatus of claim 1 wherein an automatic re-wind means is provided and is disposed and connected for sensing when the tape is wound onto the take-up reel with enough tape still connected with and remaining on the supply reel for rewinding; for automatically de-energizing the winding means; for energizing the rewinding means; and for effecting movement of said scraper blade means into good contact with the front of the tape for the ultrasonic tranducing cleaning action as the tape is rewound onto the supply reel.

8. The improved tape cleaning apparatus of claim 7 wherein said contact is effected by moving said scraper blade means sufficiently into the front of said tape to distort the straight line of the tape and effect an angle $\alpha$ of the tape within the range of 5–15 degrees so as to get good ultrasonic tranducing cleaning action.

9. The improved tape cleaning apparatus of claim 8 wherein $\alpha$ is about 10 degrees.

10. The improved tape cleaning apparatus of claim 1 wherein a packing wheel is provided for being disposed within the supply reel during take-up and is adapted for packing the tape as it is rewound onto the supply reel to get air from within the windings of the tape.

11. The improved magnetic tape cleaning apparatus of claim 1 wherein said scraper blade means is held within a scraper blade holder and an ultrasonic vibrator means is connected with said scraper blade holder so as to transduce both said holder and scraper blade means as said scraper blade means contact the tape along the front to remove the debris therefrom.

* * * * *